TRANSISTOR INVERTER AND HALF-WAVE RECTIFIER CIRCUIT

Original Filed Nov. 18, 1955

INVENTOR.
Kenneth S. Vogt
BY E. W. Christen
ATTORNEY

United States Patent Office 2,958,032

Patented Oct. 25, 1960

2,958,032

TRANSISTOR INVERTER AND HALF-WAVE RECTIFIER CIRCUIT

Kenneth S. Vogt, 120 S. Dixon Road, Kokomo, Ind.

Continuation of application Ser. No. 547,738, Nov. 18, 1955. This application Sept. 25, 1959, Ser. No. 842,526

5 Claims. (Cl. 321—2)

This invention relates to transistor circuits and more particularly to an improved inverter and half-wave rectifier combination utilizing a transistor oscillator. This application is a continuation of my patent application Seral No. 547,738, filed November 18, 1955, and assigned to the assignee of this application, and now abandoned.

In transistor oscillators employing an inductance such as a transformer winding in the output circuit, the transistor device is subject to a high inverse voltage between transistor electrodes upon collapse of the magnetic field of the inductance. As is well known, excessively high voltages impressed across transistor electrodes have a destructive effect upon the transistor. This effect is especially pronounced in transistor oscillators of the type employing inductive feedback coupling between the output and input circuits and transformer coupling to a succeeding stage such as that described and claimed in United States application Serial No. 512,176, filed May 31, 1955, now Patent No. 2,925,560, in the names of James H. Guyton and Kenneth S. Vogt, and assigned to the assignee of the present invention.

The half-wave rectifier is used with considerable advantage because of economy or performance in numerous circuit applications. It is, of course, desirable to adapt its operation for use with a transistor oscillator so that the circuit may be combined advantageously in an inverter and rectifier arrangement.

Accordingly, it is an object of this invention to provide an inverter circuit utilizing a transistor oscillator havng a half-wave rectifier circuit associated therewith adapted to limit the inverse voltage applied to the transistor electrodes.

A further object is to provide an inverter and half-wave rectifier which utilizes a transistor oscillator and which is effective to reduce the inverse voltage across the transistor electrodes permitting operation at higher power without additional components or modification of the circuit configuration.

An additional object is to provide a half-wave rectifier circuit which is transformer coupled to a transistor oscillator and which is adapted to utilize the energy stored in the transformer coupling to develop load voltage and prevent excessive inverse voltage on the transistor electrodes.

In the accomplishment of these objects there is provided a half-wave rectifier circuit in which the rectifying device is adapted to conduct in the forward direction during that portion of the oscillator cycle in which the magnetic field of the circuit inductance collapses.

Figure 1:
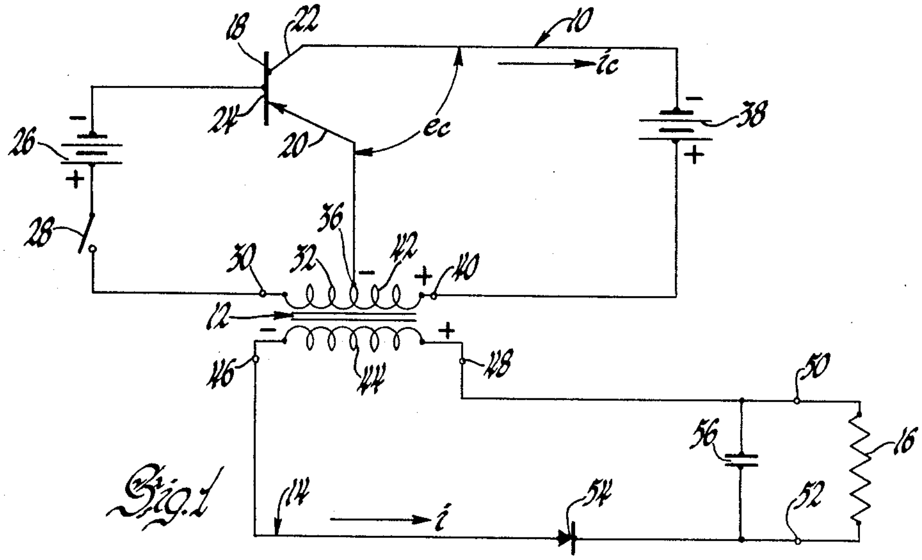

A more complete understanding of the invention may be had from the detailed description which follows taken with the accompanying drawings in which:

Figure 1 is a schematic diagram of the inventive inverter and half-wave rectifier circuit.

Figure 2:
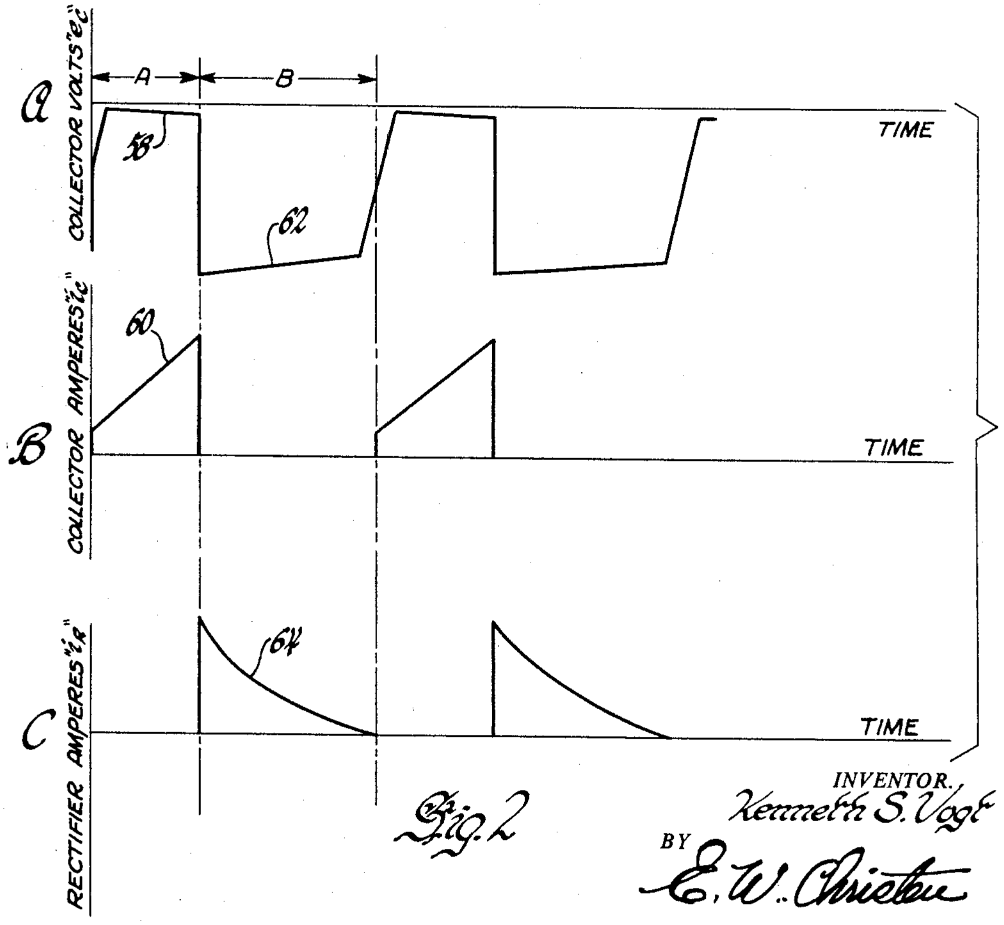

Figures 2*a*, 2*b*, and 2*c* illustrate selected voltage and current wave forms showing the time relation thereof.

Referring now to Figure 1 there is shown an illustrative embodiment of the invention in an electronic inverter adapted to develop a unidirectional voltage of high value from a unidirectional voltage of low value. In general, the system comprises a transistor oscillator 10 coupled by a transformer 12 to a rectifier circuit 14 which supplies a load device 16.

The oscillator 10 utilizes a transistor 18 having an emitter electrode 20, collector electrode 22 and base electrode 24. In the illustrative embodiment the transistor is of the P-N-P configuration in which the emitter and collector are of P-type material having holes as the majority carriers and the base is of N-type material having electrons as majority carriers. It will be apparent that the transistor may be either the point contact type or the junction type and that an N-P-N configuration may be employed if desired with a suitable reversal of polarities. In the transistor oscillator, the input circuit extends from the base electrode 24 through a conductor to the negative terminal of bias voltage source or battery 26 and thence from the positive terminal through a switch 28 to one terminal 30 of a feedback winding 32 of transformer 12. The input circuit is completed by connection of the winding terminal or tap 36 through a conductor to emitter electrode 20. The output circuit of the transistor oscillator 10 extends from collector electrode 22 through a conductor to the negative terminal of the supply voltage source or battery 38 and thence from the positive terminal to the terminal 40 of primary winding 42 of transformer 12. The output circuit is completed by connection of the winding tap 36 to emitter electrode 20.

In order to transform the output voltage of the transistor oscillator 10 to a suitable value, preferably a high value compared to the voltage of battery 38, the transformer 12 is provided with a secondary winding 44. The rectifier circuit 14 is energized by the secondary winding 44 and will be described subsequently.

At this point, operation of the oscillator circuit 10 under no load conditions will be discussed briefly in order to aid in explanation of the remainder of the system. A no load condition obtains, of course, when the transformer secondary winding 44 is open circuited. Upon closing the switch 28, the input circuit path is completed, permitting a starting current to flow from the bias voltage source 26 in the low resistance direction from the emitter electrode 20 to the base electrode 24. This starting current effectively decreases the impedance between the emitter electrode 20 and the collector electrode 22 and an initially small current flows in the output circuit. An induced voltage with the polarity indicated appears across the primary winding 42 and by virtue of inductive coupling, a feedback voltage with like polarity is developed across winding 32. This feedback voltage causes additional current to flow from the emitter to the base electrode and as a result the current from emitter to collector electrode increases. This action is cumulative and the current in the output circuit increases exponentially to a limiting value determined by the circuit parameters. At this limiting value, the feedback voltage decreases toward zero and will no longer sustain emitter to collector current; the output circuit current commences to decrease abruptly, terminating the conductive or first half-cycle. At this point the magnetic field of transformer 12 collapses, reversing the polarity of the voltage across the transformer windings 32 and 42 during the non-conductive or second half-cycle. The succeeding cycle is initiated in the same manner as that described and the action is repetitive at a high rate, producing sustained oscillations in the output circuit. During the second half-cycle of each oscillation when the magnetic field of the transformer collapses, the voltage developed thereby tends to rise to an excessive value because of the circuit impedance across the transformer terminals. This excessive voltage appears across the emitter and collector electrodes and across the emitter and base electrodes with a polarity tending to cause current flow in the high impedance direction. Such excessive voltages are known to have a destructive effect upon the transistor characteristics.

In accordance with this invention, the rectifier circuit 14 is adapted to develop a direct output voltage and to prevent the occurrence of destructive inverse voltages on the transistor electrodes. The rectifier circuit 14, of the half-wave type, is connected across the terminals 46 and 48 of the transformer secondary winding 44 and is provided with output terminals 50 and 52. The circuit comprises a rectifying device or diode 54 connected between the transformer terminal 46 and the output terminal 52. The polarity of the connection is such that the diode 54 will conduct current in the forward or low impedance direction, that indicated by the arrow head symbol, during the non-conductive portion of the cycle of the oscillator 10. A filter condenser 56 is connected across the output terminals 50 and 52 to provide a smoothing effect on the rectified output voltage which is applied to any desired load device 16, which is illustrated as a resistor for explanatory purposes.

The manner in which the rectifier circuit 14 is effective to limit the inverse voltages on the transistor electrodes to non-destructive values will become apparent from a consideration of the circuit operation. As previously described with reference to operation of the transistor oscillator 10, the voltage developed across the terminals of the transformer windings during the conductive portion of the oscillator cycle is of the polarity indicated in Figure 1. During this portion of the cycle, the voltage of the transformer secondary winding 44 is applied across the diode 54 in the reverse or high impedance direction and substantially no current flows in the rectifier circuit. The time relationship of the voltages and currents in the oscillator and rectifier circuits is illustrated in Figures 2*a*, 2*b*, and 2*c* in which the conductive portion of the oscillator cycle corresponds to the time interval A. During this interval the collector voltage $e_c$ has a generally rectangular waveform 58 and is of low value. At the same time, the collector current $i_c$ is of triangular waveform 60. The rectifier current $i_R$ is of zero value throughout the time interval A, corresponding to the conductive portion of the transistor oscillator cycle. At the termination of the time interval A, the collector current decreases abruptly to zero value at which time the magnetic field of the transformer 12 commences to collapse. The voltage developed across the transformer windings is of a polarity opposite that shown in Figure 1 and the voltage $e_c$ increases abruptly in the negative direction. This commences the non-conductive portion of the transistor oscillator cycle which corresponds to the time interval B in Figures 2*a*, 2*b*, and 2*c*. During this interval the collector current $i_c$ is of zero value. The collector voltage $e_c$, of generally rectangular waveform 62, is applied across the high impedance between collector electrode 22 and emitter electrode 20 and tends to rise to a high value under the influence of the collapsing magnetic field but is limited in value by the action of the rectifier circuit. During the non-conductive interval B, the transformer voltage is applied across diode 54 in the forward direction and rectifier current $i_R$, of sawtooth waveform 64, is caused to flow throughout the interval.

This conduction of the rectifier circuit 14 during the non-conductive portion of the oscillator cycle provides a relatively low impedance circuit through the load device in which the stored energy of the transformer is utilized. Since a low impedance circuit is provided, the transformer voltage does not rise to an excessive value and the inverse voltage applied to the transistor electrodes is limited to a non-destructive value. It will now be appreciated that the inventive circuit arrangement providing for rectification during the non-conductive portion of the oscillator cycle yields superior performance. In addition to the usual function of translating rectified energy to the load device, it serves also to prevent the occurrence of destructive inverse voltages on the transistor electrodes.

Although this description has been given with respect to a particular embodiment it is not to be construed in a limiting sense upon the scope of the invention. Many modifications within the spirit and scope of the invention will now occur to those skilled in the art. For a definition of the invention, reference is made to the appended claims.

I claim:

1. In combination, an oscillator including a transistor having an output circuit extending between selected electrodes and including an inductive device and being alternately conductive and substantially non-conductive by variation of the impedance between the electrodes whereby an inverse voltage is developed across the electrodes by the inductive device during the non-conductive interval, a half-wave rectifier circuit coupled to the output circuit and including a rectifying device poled for forward conduction during the non-conductive interval of the output circuit whereby the inverse voltages on said electrodes are limited to non-destructive values.

2. In combination, a low voltage direct current source, a transistor oscillator energized from said source for developing an oscillating current in an output circuit thereof, a transformer having a primary winding in said output circuit and a secondary winding for developing a relatively high value of alternating voltage, a half-wave rectifier circuit connected across the secondary winding including a diode poled to conduct during the non-conductive interval of the transistor oscillator.

3. An oscillator including a transistor having an input circuit extending between base and emitter electrodes and an output circuit extending between collector and emitter electrodes, said output circuit being alternately conductive and non-conductive in accordance with the varying bias conditions of the input circuit, a transformer having a primary winding in said output circuit whereby an inverse voltage is developed across the emitter and collector electrodes during non-conductive intervals of the output circuit, a secondary winding on the transformer, and a unidirectionally conductive circuit connected across the secondary winding including a sole rectifying device poled for forward conduction during the non-conductive interval of the output circuit.

4. An electronic circuit comprising a transistor having an input circuit extending between base and emitter electrodes and an output circuit extending between collector and emitter electrodes, said output circuit including an inductive device and being alternately conductive and substantially non-conductive in accordance with varying voltage conditions in said input circuit whereby an inverse voltage is developed by collapse of the magnetic field of the inductive device during the non-conductive intervals, a half-wave rectifier circuit connected across the inductive device including a sole rectifying device poled for forward conduction during the non-conductive intervals of the output circuit.

5. In combination, an oscillator including a transistor having an input circuit extending between base and emitter electrodes and an output circuit extending between collector and emitter electrodes, said output circuit being alternately conductive and substantially non-conductive in accordance with the bias conduction of the input circuit, a transformer having a primary winding connected in said output circuit and a feedback winding connected in said input circuit inductively coupled to the primary winding whereby inverse voltages are applied to the base and collector electrodes during the non-conductive interval of the output circuit, a secondary winding on the transformer, and a half-wave rectifier circuit connected across the secondary winding including a rectifying device poled for forward conduction during the non-conductive interval of the output circuit.

References Cited in the file of this patent

UNITED STATES PATENTS

| | | |
|---|---|---|
| 2,556,286 | Meacham | June 12, 1951 |
| 2,780,767 | Janssen | Feb. 5, 1957 |
| 2,791,739 | Light | May 7, 1957 |
| 2,846,581 | Volkers | Aug. 5, 1958 |

FOREIGN PATENTS

| | | |
|---|---|---|
| 728,024 | Great Britain | Apr. 13, 1955 |